United States Patent
Zhang et al.

(10) Patent No.: US 7,023,580 B2
(45) Date of Patent: Apr. 4, 2006

(54) SYSTEM AND METHOD FOR DIGITAL IMAGE TONE MAPPING USING AN ADAPTIVE SIGMOIDAL FUNCTION BASED ON PERCEPTUAL PREFERENCE GUIDELINES

(75) Inventors: Xuemei Zhang, Mountain View, CA (US); Robert W. Jones, Corvallis, OR (US); Izhak Baharav, San Jose, CA (US); Donald M. Reid, Corvallis, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 1111 days.

(21) Appl. No.: 09/839,335

(22) Filed: Apr. 20, 2001

(65) Prior Publication Data

US 2002/0171852 A1   Nov. 21, 2002

(51) Int. Cl.
*H04N 1/407* (2006.01)
*H04N 1/56* (2006.01)
*G06T 5/40* (2006.01)

(52) U.S. Cl. .................. 358/1.9; 358/3.21; 358/519; 358/521; 358/522; 382/169

(58) Field of Classification Search ................ 358/1.9, 358/3.01, 3.21, 3.24, 3.27, 519, 521, 522, 358/447; 382/168, 169, 274, 254
See application file for complete search history.

(56) References Cited

U.S. PATENT DOCUMENTS 4,975,970 A   12/1990   Zettel et al.

(Continued)

FOREIGN PATENT DOCUMENTS

EP   0 848 545   11/1997

OTHER PUBLICATIONS

CIE (1978); Recommendations on Uniform Color Spaces—Color Difference Equations Psychometric Color Terms; *Commission Internationale De L 'Eclairage International Commission on Illumination Internationale Beleuchtungskommission*; Supplement No. 2 to CIE Publication No. 15; (France); 10 pages.

(Continued)

*Primary Examiner*—Scott A. Rogers

(57) ABSTRACT

An adaptive image tone mapping curve based on perceptual preference guidelines is generated as a sigmoidal function, in which the sigmoidal function parameters (slope and shift) are determined by original image statistics. Tone curves generated for different images each have a smooth sigmoidal shape, so that the tone mapping process does not change the image histogram shape drastically. The sigmoidal function has the form:

$$t(x) = \frac{100}{1 + \exp(-\alpha(x/100 - \beta))},$$

where $\alpha$ is the slope parameter and $\beta$ is the shift parameter. The input value x in the sigmoidal function varies in the range [0, 100], because the tone curve is generated on an L* scale, which has values from 0 to 100. The sigmoidal tone curve calculation can be implemented efficiently using simple arithmetic operations by pre-calculating and storing various factors used in the calculation of $\alpha$ and $\beta$ and by pre-generating a pair of fixed tone curves with two extreme slopes and interpolating between the curves.

20 Claims, 11 Drawing Sheets

U.S. PATENT DOCUMENTS

| | | | |
|---|---|---|---|
| 5,581,370 A * | 12/1996 | Fuss et al. | 382/254 |
| 5,991,456 A | 11/1999 | Rahman et al. | 382/254 |
| 6,198,842 B1 | 3/2001 | Yeo et al. | 382/166 |
| 6,198,843 B1 | 3/2001 | Nakauchi et al. | 382/167 |
| 6,198,848 B1 | 3/2001 | Honma et al. | 382/232 |
| 6,345,128 B1 * | 2/2002 | Stokes | 382/254 |
| 6,393,148 B1 * | 5/2002 | Bhaskar | 382/169 |
| 6,822,762 B1 * | 11/2004 | Moroney et al. | 358/1.9 |
| 6,826,310 B1 * | 11/2004 | Trifonov et al. | 382/274 |

OTHER PUBLICATIONS

Holm, J. (1996); Photographic Tone and Colour Reproduction Goals; *CIE Expert Symposium on Colour Standards for Image Technology*; pp. 51-56.

Jobson, D., Rahman, Z., and Woodell, G. (1997); A Multiscale Retinex For Bridging the Gap Between Color Images and Human Observation of Scenes; *IEEE Transactions on Image Processing*; vol. 6 No. 7; pp 965-976.

Larson, G. W., Rushmeier, H., and Piatko, C. (1997); A Visibility Matching Tone Reproduction Operator for High Dynamic Range Scenes. *IEEE Transactions on Visualization and Computer Graphics*, vol. 3 No. 4; pp. 291-306.

Rahman, Z., Jobson, D., and Woodell, G. (1996); Multiscale Retinex for Color Image Enhancement; *Proceedings, International Conference on Image Processing*, vol. 3; (Lausanne, Switzerland); pp. 1003-1006.

Rahman, Z., Woodell, G., Jobson, D.; A Comparison of the Multiscale Retinex With Other Image Enhancement Techniques; College of William & Mary; NASA Langley Research Center; 6 pages.

Tanaka, T., Berns, R. S., and Fairchild, M.D. (1997); Predicting the Image Quality of Color Overhead Transparencies Using a Color-appearance Model; *Journal of Electronic Imaging*, vol. 6 No. 2; pp. 154-164.

Tumblin, J. and Rushmeier, H. (1993); Tone Production for Realistic Images; *IEEE Computer Graphics and Applications*; vol. 13 No. 6; pp. 42-48.

Tumblin, J. and Turk, G. (1999); LCIS: A Boundary Hierarchy for Detail-preserving Contrast Reduction; *Computer Graphics Proceedings*; *SIGGRAPH 99*; pp. 83-90.

European Search Report dated Nov. 29, 2004.

Yuichi Kobayashi and Toshikazu Kato—"A High Fidelity Contrast Improving Model Based On Human Vision Mechanisms"; 0-7695-0253—Sep. 9, 1999; 1999 IEEE; pp. 578-584.

Gustav J. Braun and Mark D. Fairchild—"Image Lightness Rescaling Using Sigmoidal Contrast Enhancement Functions"; Journal Of Electronic Imaging, Oct. 1999, vol. 8(4); pp. 380-393.

* cited by examiner

SYSTEM AND METHOD FOR DIGITAL IMAGE TONE MAPPING USING AN ADAPTIVE SIGMOIDAL FUNCTION BASED ON PERCEPTUAL PREFERENCE GUIDELINES

BACKGROUND OF THE INVENTION

1. Field of the Invention

The present invention relates generally to digital image tone mapping algorithms, and specifically to digital image tone mapping algorithms based on perceptual preference guidelines.

2. Description of Related Art

Digital image tone mapping refers to the process of mapping captured scene luminance levels to the luminance or density levels of an output device (display or printer). Digital image tone mapping is necessary due to the fact that scene luminance ranges very seldom match the luminance range of the output device. Digital image tone mapping algorithms can be implemented within any digital device to produce visually pleasing output images. For example, such devices can include digital cameras, scanners, digital camcorders, printers capable of printing digital images and digital televisions. In addition, digital tone mapping algorithms are frequently used in image enhancement software applications.

Since the human eye adapts to different light levels in different ways, perceptual factors must be taken into account when attempting to generate a rendered image that looks "right" with respect to the original scene. Depending on the application, image tone mapping typically has one of three goals: (1) appearance match; (2) subjective preference; or (3) information preservation. The goal of appearance matching strives to make the rendered image as perceptually similar as possible to the original scene. This is usually an implicit goal in consumer imaging and image synthesis applications. Taking into account subjective preferences allows the image to look as pleasing as possible to the viewer. This is usually desirable in consumer imaging and commercial photography. If the goal is information preservation, the algorithm seeks to preserve or enhance the details at all regions and all luminance levels of an image. This is most often requested in medical imaging, satellite imaging, and archiving.

Many existing tone mapping algorithms focus on achieving an appearance match between the original image and the rendered image. There are at least two perceptual factors typically considered in such algorithms: (1) global luminance adaptation; and (2) local luminance adaptation. The overall global luminance level of the scene influences the adaptation state of the eye. Two aspects of such global luminance adaptation have significant impact on tone mapping, brightness and spatial contrast.

First, the brightness function is different at different scene luminance levels. Perceived brightness, which corresponds to the viewer's perceived strength of light, is roughly a power function of physical luminance (Steven's law). The exponent for such a power function is larger when the overall luminance level is higher. When rendering an image on a lower luminance device, the exponent must be adjusted to accommodate such differences. In addition to the brightness function change, the spatial contrast sensitivity of the eye also changes as it adapts to different ambient luminance levels. When the ambience is bright, the eye perceives the high spatial frequency components (details) of an image better than when the ambience is dark, i.e., the visual acuity of the eye improves with better ambient lighting. Also, the contrast threshold, i.e., the minimum contrast needed to detect components of the image, decreases with increased luminance level. To render a bright image onto a lower luminance device, the luminance contrast of the details in the image can be enhanced to account for these effects.

Two different tone mapping algorithms developed by Jack Holm and Tumblin & Rushmeier, respectively, account for the brightness function change by adjusting the curvature of the tone curves based on the absolute luminance level of the scene. Each of these tone mapping methods is described separately in Holm, J., "Photographic Tone and Colour Reproduction Goals," CIE Expert Symposium on Colour Standards for Image Technology, pp. 51–56 (1996); and Tumblin, J. and Rushmeier, H., "Tone Reproduction for Realistic Images," IEEE Computer Graphics and Applications, 13(6):42–48 (1993), both of which are hereby incorporated by reference. These algorithms have the benefit of creating the proper overall sensation of brightness or darkness corresponding to the original image, which is desirable in high-end digital imaging. However, both require accurate information about the absolute luminance level of the original image. In a digital camera, it is possible to estimate absolute luminance levels of image pixels from the raw pixel values and the camera's capture settings such as aperture, exposure time, lens properties, etc. However, in low cost cameras, such calculations are often not available due to the added complexity and cost. Therefore, a global luminance adaptation solution that focuses on preference is more practical.

In tone mapping algorithms based on preference, the goal is to achieve a certain set of image properties liked by viewers. The widely used histogram equalization method can be categorized as such an algorithm. The histogram method is based on the observation that most "good" images have a luminance histogram that fully occupies the output dynamic range. The algorithm adjusts image gray levels to move the histogram shape toward a flat, Gaussian, or some other predetermined shape. Of course, how well such a method works depends on whether the assumption is true that every "good" image has the same histogram. The method does well on images that have a symmetric and well-distributed histogram, but makes images look unnatural when there are large areas of dark or light background in the image, which bias the histogram toward one side.

A modified histogram equalization method developed by Larson, et al. is more robust than traditional histogram equalization methods. Larson's method limits the amount of gray level adjustments allowed in the tone mapping. The amount of gray level adjustments are limited based on luminance contrast sensitivity measurements. In addition, one variation of this method also accounts for the change in visual acuity under different illumination levels. Reference is made to Larson, G. W., Rushmeier, H. and Piatko, C., "A Visibility Matching Tone Reproduction Operator for High Dynamic Range Scenes," IEEE Transactions on Visualization and Computer Graphics, 3(4):291–306 (1997), which is incorporated by reference. However, the computation is iterative, and thus the implementation is costly and slow. In addition, the modified histogram equalization method also requires accurate absolute luminance level information. Thus, although this modified histogram equalization method creates a more accurate appearance match, it does so at the cost of higher computational complexity.

The local luminance adaptation perceptual factor considers the fact that the eye looks at an image by scanning around. The eye can rapidly adapt to the luminance level of small regions in the original scene to enable regions in the shadows and in the highlights to be clearly visible to the eye. In the rendered image, both the dynamic range and the adaptation environment are different. Therefore, to fully imitate the eye's adaptation process, the luminance levels of an image are adjusted according to its local luminance levels.

Various local tone mapping algorithms, such as Tumblin's detail-preserving contrast reduction method (Tumblin, J. and Turk, G., "LCIS: A Boundary Hierarchy for Detail-Preserving Contrast Reduction," Computer Graphics Proceedings, SIGGRAPH 99, pp. 83–90, Los Angeles, Calif., USA (1999), which is incorporated by reference), and various algorithms based on the retinex theory have attempted to imitate the local luminance adaptation process. Reference is made to Jobson, D., Rahman, Z. and Woodell, G., "A Multiscale Retinex for Bridging the Gap Between Color Images and Human Observation of Scenes," IEEE Transactions on Image Processing, 6(7):965–976 (1997); and Rahman, Z., Jobson, D. and Woodell, G., "Multi-Scale Retinex for Color Image Enhancement, Proceedings," International Conference on Image Processing, volume 3, pp. 1003–1006, Lausanne, Switzerland (1996) for a discussion of the retinex theory, both of which are incorporated by reference. Although these algorithms do preserve the local contrast of images, they are iterative methods that also involve the decomposition of different spatial resolution components of an image, which is computationally costly.

SUMMARY OF THE INVENTION

A system and method for implementing an adaptive digital image tone mapping algorithm that is based on perceptual preference guidelines is provided. The tone curve is generated as a sigmoidal function having sigmoidal function parameters (slope and shift) that are determined by original image statistics. Since the parameters are based on original image statistics, the algorithm is adaptive. Tone curves generated for different images each have a smooth sigmoidal shape, so that the tone mapping process does not change the image histogram shape drastically. Therefore, the algorithm is both robust and conservative (e.g., while improving the appearance for most images, the algorithm does not make any images look worse). The sigmoidal function has the form:

$$t(x) = \frac{100}{1 + \exp(-\alpha(x/100 - \beta))},$$

where $\alpha$ is the slope parameter and $\beta$ is the shift parameter. The input value x in the sigmoidal function varies in the range [0, 100], because the tone curve is generated on an L* scale, which has values from 0 to 100. The sigmoidal tone curve calculation can be implemented efficiently using simple arithmetic operations by pre-calculating and storing various factors used in the calculation of $\alpha$ and $\beta$ and by pre-generating a pair of fixed tone curves with two extreme slopes and interpolating between the curves.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS OF THE PRESENT INVENTION

The numerous innovative teachings of the present application will be described with particular reference to the presently preferred exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
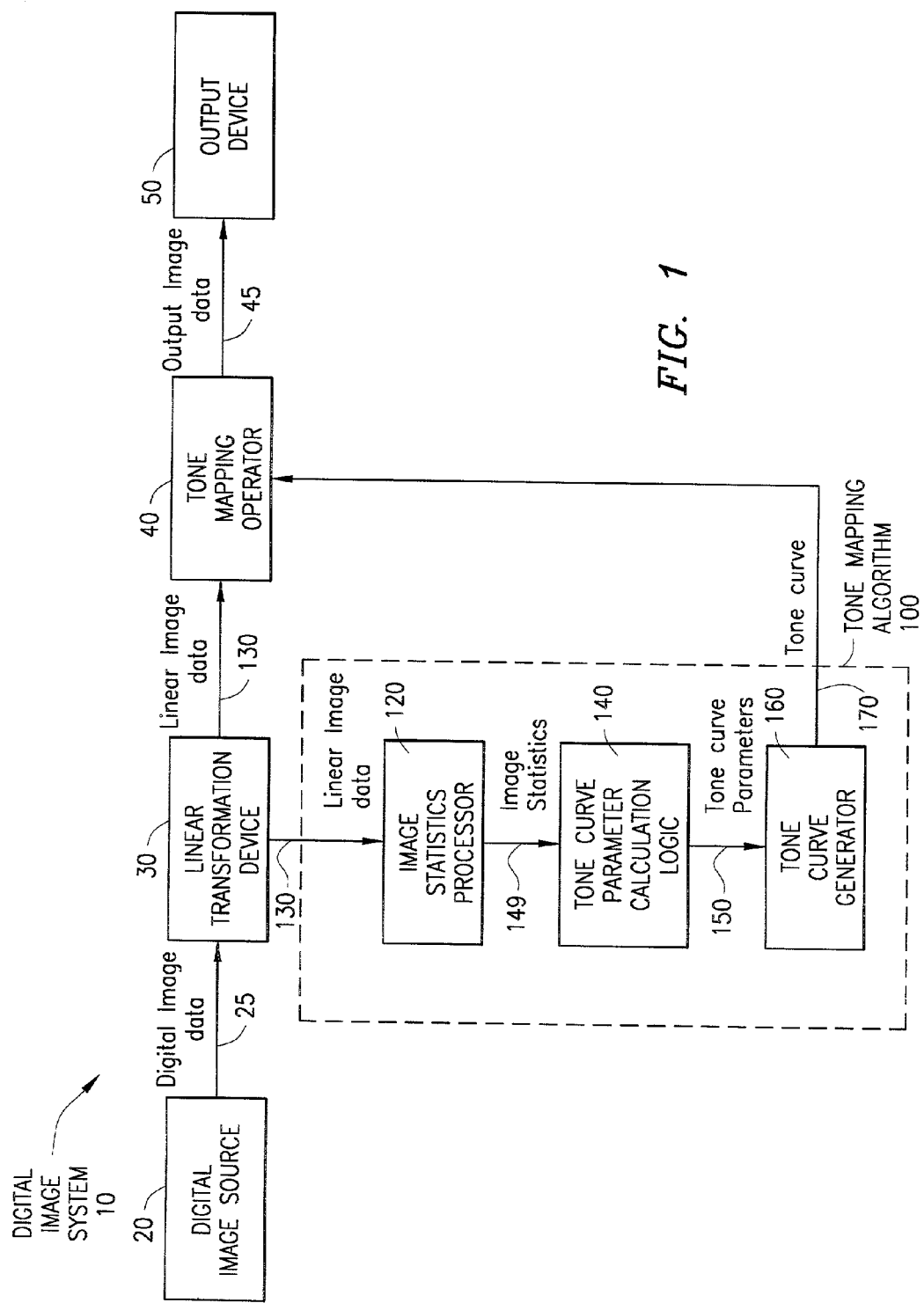
FIG. 1 is a block diagram illustrating a system utilizing a preferred embodiment of the tone mapping algorithm of the present invention.

With reference now to FIG. 1, a digital image tone mapping algorithm 100 in accordance with preferred embodiments of the present invention is shown implemented within a digital image system 10. The digital image system 10 can be any digital device, including, but not limited to, a digital camera, scanner, digital camcorder, printer capable of printing digital images or digital television. The algorithm 100 can be included within an image processing chip of the digital device, such as a low-end CMOS sensor chip, a CCD sensor chip or a separate image processing chip packaged together with the sensor chip, or within a software package (driver) associated with the digital device. Alternatively, the digital image system 10 can be a computer system having an image enhancement software package installed thereon in order to enhance tonal characteristics of digital images.

The tone mapping algorithm 100 is simple and fast in terms of memory and processing time, and uses a global tone mapping method, with one tone curve for all color channels. It should be noted that the tone mapping algorithm 100 can be applied to both color images and monochrome images. The tone mapping algorithm 100 produces a smooth and consistent tone curve, with gentle curvature, which avoids the extreme contrast changes evident in some histogram equalization methods. In addition, the tone mapping algorithm 100 is ideal for video applications since the tone curve remains relatively stable from frame to frame by using an adaptive tone which is always sigmoidal in shape. Furthermore, the tone mapping algorithm 100 generates images that look pleasing to the user (in terms of brightness, contrast and color constancy) without requiring an estimation of the absolute luminance levels of the original image.

The tone mapping algorithm 100 is based on perceptual preference guidelines, such as the preservation of general histogram shape at the middle range by using a centering function on L* nth and (100−n)th percentile values, an L* standard deviation of around 20 and a mean L* value of around 50. It should be understood that the L* scale is simply a transformation from a linear scale based on received linear image data. It should be noted that other perceptual preference guidelines can be used based on the requirements of the user or the specific digital image system 10 in which the tone mapping algorithm is implemented. In order to produce a tone mapping algorithm 100 that takes into consideration perceptual preferences and that complies with computation complexity constraints, a sigmoidal function tone mapping method is used, which will be described in more detail hereinbelow with respect to FIGS. 2–8.

Figure 2:
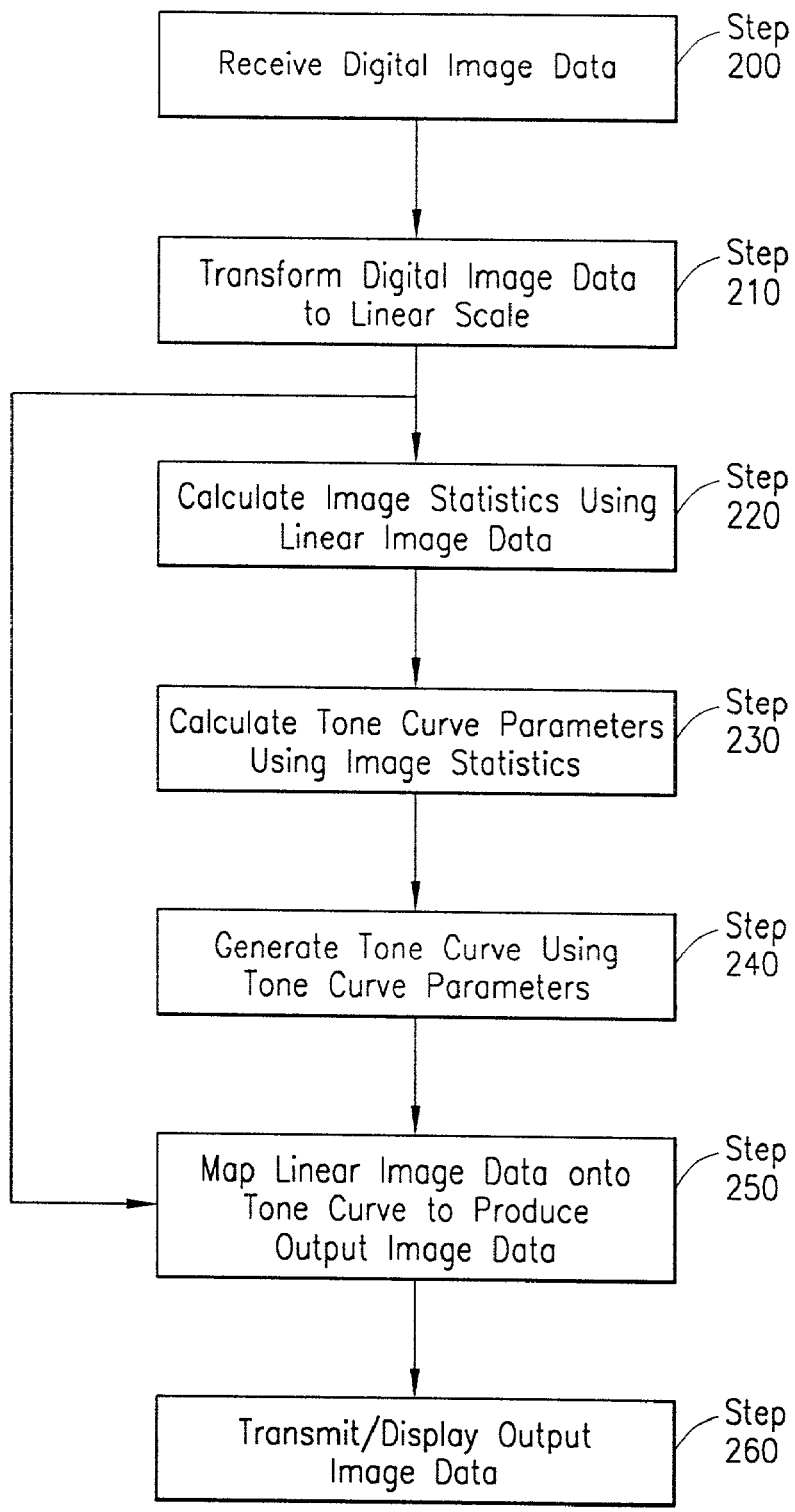
FIG. 2 is a flow chart illustrating the steps involved in the tone mapping algorithm shown in FIG. 1 of the drawings.

With reference now to FIG. 2, which will be described in connection with FIG. 1, there is illustrated the steps for mapping received digital image data representing the luminance (pixel) values of a digital image to the luminance range of an output device 50, using the tone mapping algorithm 100 of the present invention. A digital image source 20, such as a digital image capture device or a digital image file, provides digital image data 25 associated with a digital image to a linear transformation device 30 (step 200), which transforms the digital image data 25 into linear image data 130 on a linear scale (step 210). It should be noted that the original digital image data 25 may be on any scale. Alternatively, the digital image data 25 may already be on a linear scale, which obviates the need for the linear transformation device 30. This linear image data 130 is later used by a tone mapping operator 40 to map the linear image data 130 onto the luminance range of the output device 50 (step 250).

Once transformed, the linear image data 130 is passed to an image statistics processor 120, which determines one or more image statistics 149 based on the original linear image data 130 (step 220). These image statistics 149 are used by tone curve parameter calculation logic 140, along with one or more predefined perceptual preferences in the calculation of two tone curve parameters 150, namely, the slope parameter and the shift parameter (step 230). The pre-defined perceptual preferences may be defined by an operator (e.g., a user or manufacturer of the digital image system 10). The shift parameter shifts the tone curve so that under or overexposed images are brought closer to the right range. The slope parameter stretches or compresses the tone curve to achieve a desired histogram spread. These two tone curve parameters 150 are used by a tone curve generator 160 in generating a tone curve 170 for the image (step 240). The tone curve generator 160 produces a sigmoidal tone curve 170 using the following sigmoidal function:

$$t(x) = \frac{100}{1 + \exp(-\alpha(x/100 - \beta))}, \quad \text{(Equation 1)}$$

where $\alpha$ is the slope parameter and $\beta$ is the shift parameter. The input value x in the sigmoidal function varies in the range [0, 100], because the tone curve 170 is generated on an L* scale, which is a measure of the brightness level of the image pixels and has values from 0 to 100. Based on the CIE standard formula, the L* scale is approximately a cube root transformation of the linear image data:

$$L* = 116\left(\frac{Y}{Y_n}\right)\frac{1}{3} - 16, \quad \text{(Equation 2)}$$

where Y is linear luminance, and $Y_n$ is the luminance level of the white point. Due to the fact that Y values are normalized by $Y_n$ values for the calculation of L*, the absolute scale of Y and $Y_n$ is not important, as long as both are proportional to the absolute luminance. In implementation, the raw or color-corrected linear RGB values may take the place of the Y values.

The L* scale is the preferred scale in the generation of the tone curve 170 for several reasons. First, the L* scale is perceptually more uniform than a linear scale. Second, most natural images tend to have more symmetric histograms on an L* scale than on a linear scale, which makes the adjustment of the histogram spread easier (and perceptually more robust) on the L* scale. However, it should be noted that a linear scale may be used by the tone curve generator 160 instead of the L* scale described herein. Also, it should be understood that the sigmoidal tone curve 170 asymptotes to 0 and 100 at negative and positive infinity. Therefore, once the tone curve 170 is generated, the curve 170 must be scaled to the [0, 100] range after to make sure 0 maps to 0 and 100 maps to 100 as follows:

$$t_1(x) = \frac{100(t(x) - t(0))}{t(100) - t(0)}. \quad \text{(Equation 3)}$$

Figure 9:
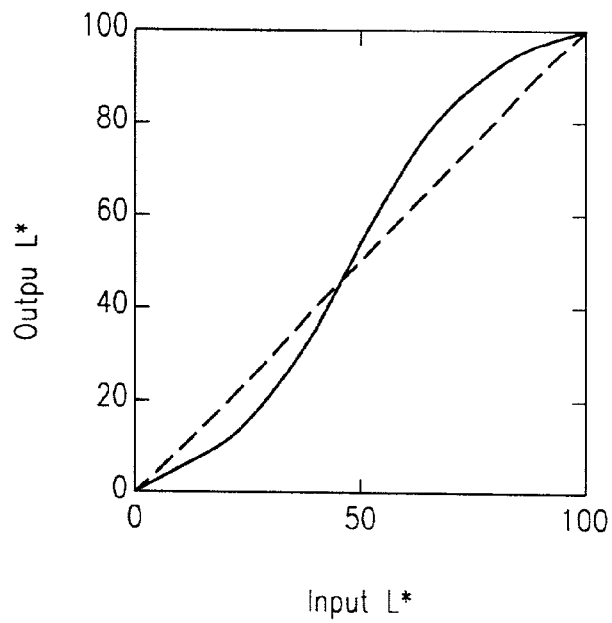
FIG. 9 is a graphical representation of a sample tone curve of the type generated by the tone mapping algorithm of the present invention.

The sigmoidal shaped tone curve 170 of the type shown in FIG. 9 that is produced by the tone curve generator 160 has several properties that satisfy the constraints and perceptual preferences discussed above. The sigmoidal shaped tone curve 170 is mostly linear at the mid range, with saturation at the dark and bright end if the slope is high. A mostly linear segment at the mid range means that for most images, the bulk of the pixels will be mapped more or less linearly, thus preserving the shape of the original histogram. In addition, the parameters of the sigmoidal tone curve 170 can be set to achieve the desired L* standard deviation level. Furthermore, the sigmoidal function is smooth, with rather consistent curvature across different parameter settings (accelerating before the $\beta$ point, decelerating after). Therefore, the sigmoidal function is unlikely to generate tone curves 170 that have wild bends and peaks.

Once the tone curve 170 is generated (step 240), the received linear image data 130 is mapped onto this tone curve 170 by the tone mapping operator 40 to produce output image data 45 corresponding to the levels of the output device 50 (step 250). It should be noted that the output device 50 can be a display, printer or other image processing device. It should also be noted that additional processing may be performed on the output image data 45 prior to being sent to the output device 50 (step 260).

Figure 3A:
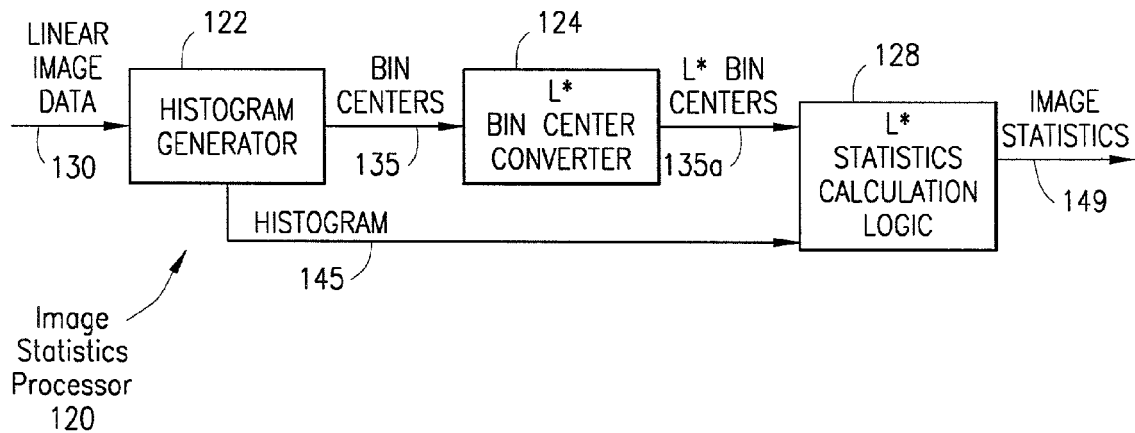
FIGS. 3A–3C are block diagrams illustrating alternative embodiments for implementing the image statistics processor shown in FIG. 1 of the drawings.
Figure 4A:
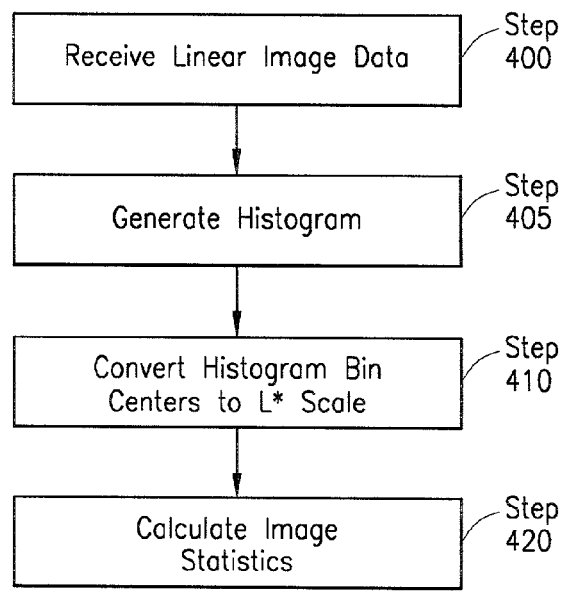
FIGS. 4A–4C are flow charts illustrating the steps involved in each of the embodiments shown in FIGS. 3A–3C, respectively.
Figure 3B:
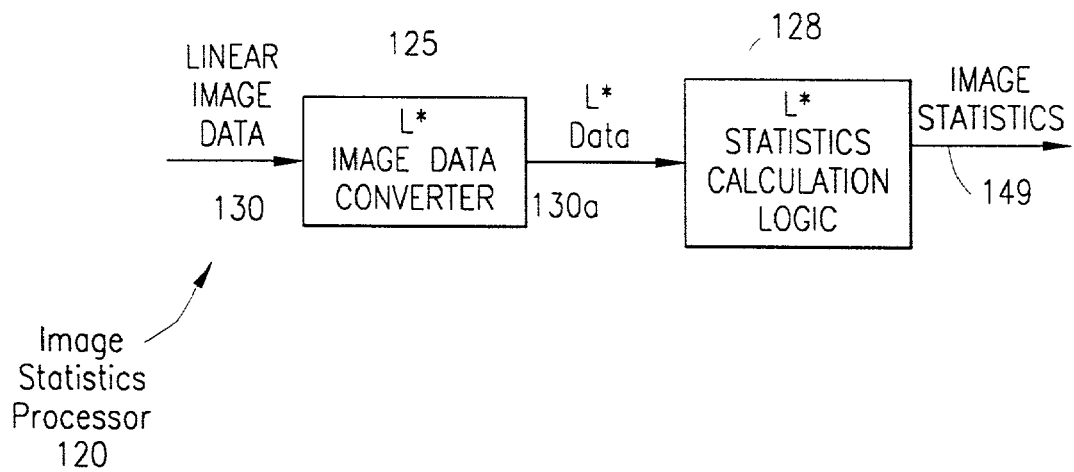
Figure 4B:
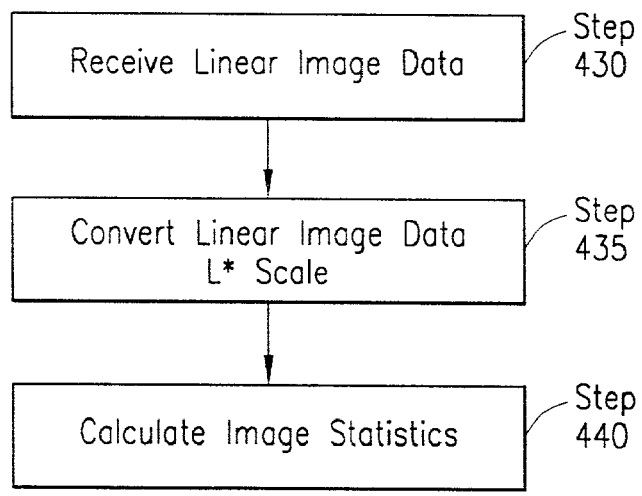
Figure 3C:
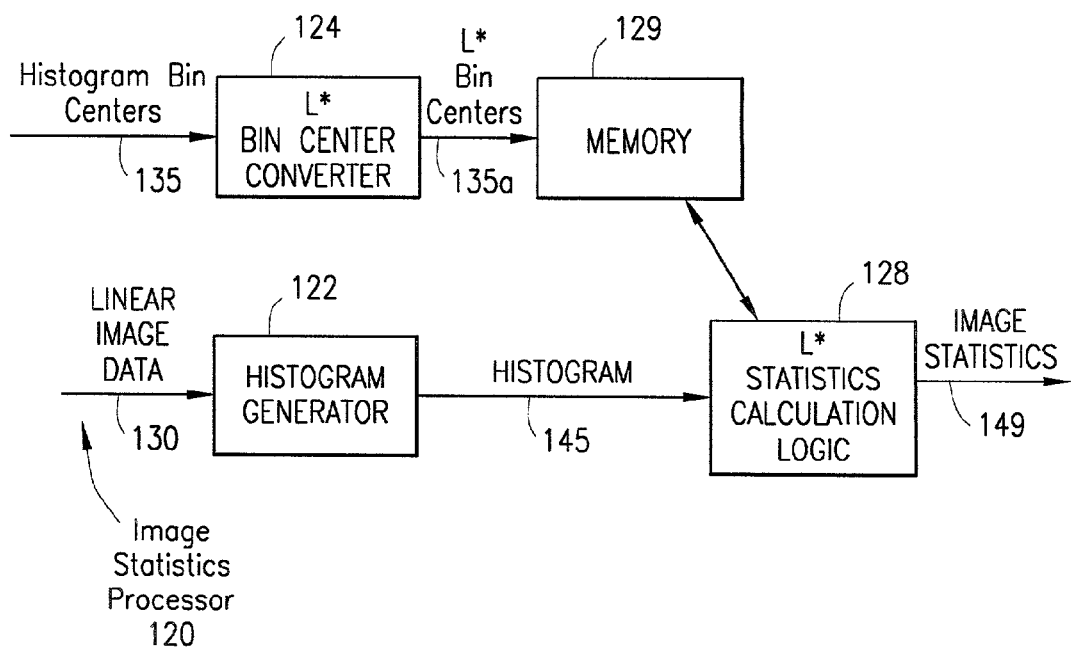
Figure 4C:
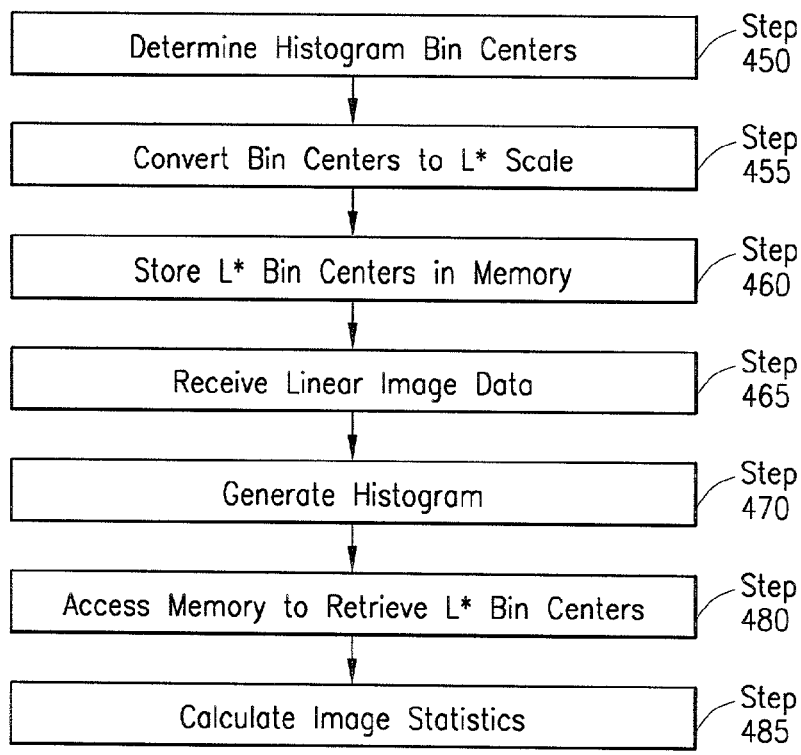

With reference now to FIGS. 3A–3C of the drawings and the corresponding flow charts of FIGS. 4A–4C, alternative embodiments for implementing the image statistics processor of FIG. 1 are illustrated. In a first embodiment, as shown in FIG. 3A and described in FIG. 4A, the linear image data 130 (step 400) is passed to a histogram generator 122, which produces a histogram 145 (e.g., a table) describing the distribution of the digital values of the data 130 (step 405). For example, in a color digital image, there are a certain number of red, blue and green values (e.g., one of each for each pixel in the image). In order to produce a histogram of green values, for example, the histogram generator 122 determines a bin size (e.g., range of values, such as 0–10, 11–20, 21–30, etc.) and counts the number of occurrences of green pixel values in each bin. To create a graphical representation of the histogram, the data in each bin is plotted as a function of the bin centers (e.g., 5, 15, 25, etc.).

Once the histogram is created, the histogram bin center values 135 are transmitted to an L* bin center converter 124 to transform the linear bin center values 135 into L* bin center values 135a (step 410). The conversion is performed using equation (2) above, with Y being the bin center values, and $Y_n$ being the largest possible digital value for the pixel values. The L* bin center values 135a and the histogram 145, which includes the count of the number of values in each bin are transmitted to L* statistics calculation logic 128, which calculates the image statistics 149 (step 420) that are subsequently used in the calculation of the slope parameter α and the shift parameter β for the sigmoidal tone curve.

The various embodiments for calculating the slope parameter α and the shift parameter β are discussed below with reference to FIGS. 5 and 6. Briefly, the L* image statistics 149 used for calculation of the slope parameter α and the shift parameter β include the current L* standard deviation and either the current mean L* value or the L* percentile values of the histogram (nth and (100–n)th percentiles). The L* percentile values of the histogram represent the end points of the histogram. Therefore, n is chosen to be relatively small (preferably less than 5). For example, if 5% of all L* pixel values have values less than 18, then the 5$^{th}$ percentile is 18, thus the low end point would be 18. The high end point would then just be the L* value corresponding to the 95$^{th}$ percentile (e.g., 95% of all L* pixel values have values lower than the high end point).

The current L* standard deviation $\sigma_{current}$ can be calculated from the histogram as follows:

$$\sigma_{current} = \frac{1}{n}\sum_{i=1}^{n_b}\left(n_i(B_i - \overline{L})^2\right),\qquad\text{(Equation 4)}$$

where $B_i$s are histogram bin centers in L* values, $n_1$ is the pixel count in the ith bin of the histogram, $n_b$ is the number of histogram bins, n is the total number of pixels in the image, and $\overline{L}$ is the mean pixel L* value, which can also be calculated from the image histogram as follows:

$$\overline{L} = \frac{1}{n}\sum_{i=1}^{n_b}(n_i * B_i).\qquad\text{(Equation 5)}$$

In one embodiment, $\sigma_{current}$ is calculated from the histogram on the green color plane only. For most sensors, the green channel is the color plane that approximately captures the luminance information. However, it should be noted that some combination of the RGB pixel values can be used instead to calculate the image L* standard deviation. The resulting tone curve should not vary significantly as long as the choice is a reasonable representation of the luminance.

Alternatively, as shown in FIG. 3B and described in FIG. 4B, if the histogram is not available, the image statistics 149 can be calculated from the image pixel values themselves. Therefore, when linear image data 130 arrives at the image statistics processor 120 (step 430), the linear image data 130 is converted into L* image values 130a by an L* image data converter 125 (step 435), and the L* image values 130a are passed onto the L* statistics calculation logic 128, where the image statistic 149 (e.g., current L* standard deviation and either the current mean L* value or the L* percentiles) are calculated (step 440). For example, in this embodiment, the current mean L* value can be calculated by taking the average of all of the L* image values.

As a further alternative, as shown in FIG. 3C and described in FIG. 4C, to reduce computational complexity, since the histogram bins do not change from image to image (only the counts in each bin change), the histogram bin center values 135 can be converted into L* bin center values 135a prior to receiving the linear image data 130. Therefore, in this embodiment, once the histogram bin center values 135 are determined (step 450), the bin center values 135 are converted to L* bin center values 135a by the L* bin center converter 124 (step 455) and these L* bin center values 135a are stored in a memory 129 accessible to or within the image statistics processor 120 (the latter being illustrated) (step 460). As a further alternative, the conversion to L* bin center values 135a can be performed externally, and the L* bin center values 135a can be pre-loaded into the memory 129.

Thereafter, when the linear image data 130 arrives at the image statistics processor 120 (step 465), the linear image data 130 is sent to the histogram generator 122 (described above), which counts the number of pixel values in each bin (step 470). Once counted, the table 145, which includes the count of the number of pixel values in each bin is sent to the L* statistics calculation logic 128, which retrieves the L* bin center values 135a from the memory 129 (step 480) to calculate the image statistics 149 (step 485). With this embodiment, the image statistics 149 (e.g., L* standard deviation and mean L* value) can be calculated with only simple addition, subtraction and multiplication.

Figure 5:
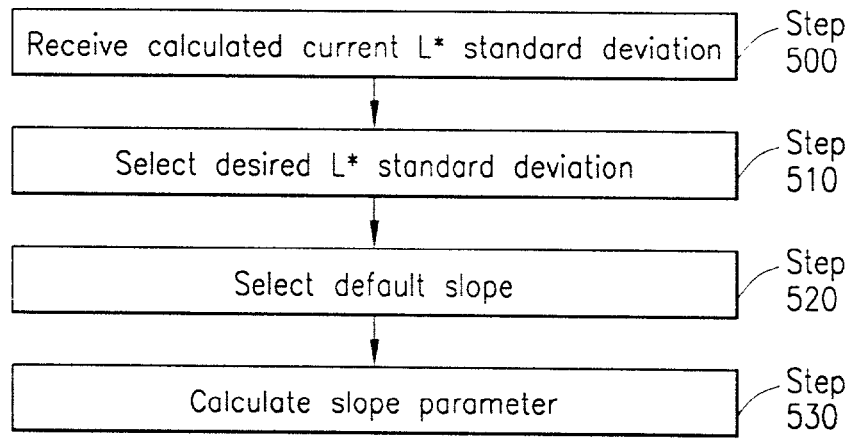
FIG. 5 is a flow chart illustrating the steps for calculating the slope parameter of the tone mapping algorithm of FIG. 1.
Figure 6A:
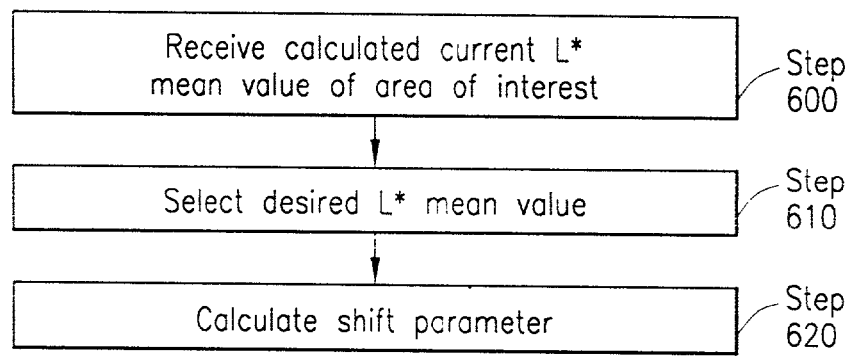
FIGS. 6A and 6B are flow charts illustrating alternative embodiments for calculating the shift parameter of the tone mapping algorithm of FIG. 1.
Figure 6B:
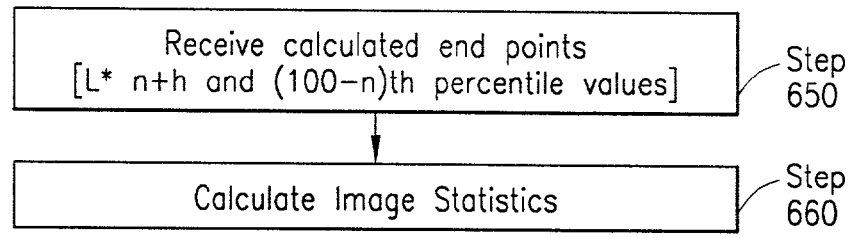

With reference now to FIGS. 5, 6A and 6B, there is illustrated the steps for calculating the slope parameter α and the shift β parameters using the image statistics (e.g., L* standard deviation and either mean L* value or L* percentiles) calculated by the image statistics processor. In calculating the shift parameter and the slope parameter, as discussed above, various perceptual preference guidelines can be used to produce an output image that is pleasing to the viewer. The perceptual preference guidelines can be chosen by the user or can be selected by the manufacturer of the specific digital image system in which the tone mapping algorithm is implemented. As an example, the following discussion is based on three preferred perceptual preferences, including the preservation of general histogram shape at the middle range, a desired L* standard deviation level of around 20 and a desired mean L* level of around 50. It should be understood that other perceptual preferences can be used instead of these preferred preferences.

As illustrated in FIG. 5, to determine the slope parameter α, the current L* standard deviation calculated by the image statistics processor is transmitted to the tone curve parameter calculation logic (shown in FIG. 1) (step 500). The desired L* standard deviation is pre-selected by the user or the manufacturer and stored within a memory (not shown) accessible to or within the tone curve parameter calculation logic (step 510). As discussed above, in preferred embodiments, the desired L* standard deviation is chosen to be about 20. However, other values can be chosen, depending upon the requirements of the user or the manufacturer. Values greater than 20 produce a more contrasty image, while values less than 20 produce a less contrasty image. In addition to the desired L* standard deviation, a default slope value is also pre-selected (step 520).

With a linear tone curve, the standard deviation can be changed from one value (p) to another value (q) by using a tone curve slope of q/p. The sigmoidal tone curve is non-linear, but the mid-section of the sigmoidal curve is mostly linear. Since for most images, a large proportion of image pixels have values close to the mid-range (around the point x=$\overline{L}$ for one of the embodiments), the slope of the sigmoidal curve can be changed at this point to try to achieve the desired L* standard deviation.

At the point x=100β, the slope of t(x) is 1 when α=4. Therefore, the default slope $\alpha_{default}$ can be set to 4. However, the actual tone curve used (as discussed above) is $t_f(x)$, which has a slope of 1 when α is less than 4. In practice, any value between 3 and 4 can be used as the default slope $\alpha_{default}$, depending on how contrasty one would like the image to look. Once the default slope has been selected, the slope parameter α can be calculated based on the current L* standard deviation, the desired L* standard deviation and the default slope (step 530). To get the slope parameter α for an image with an L* standard deviation of $\sigma_{current}$, the default α value is scaled according to the current L* standard deviation and the desired L* standard deviation $\sigma_{desired}$ as follows:

$$\alpha = \alpha_{default} \times \frac{\sigma_{desired}}{\sigma_{current}}. \quad \text{(Equation 6)}$$

As mentioned above, the shift parameter β shifts the histogram to affect the general brightness of the output image. There are different ways to determine the shift parameter, depending on what perceptual factors are more important in the particular application, and what computational complexity is allowed. FIGS. 6A and 6B illustrate two such alternative embodiments for calculating the shift parameter β.

In a first embodiment, as shown in FIG. 6A, the shift parameter β is calculated based on the mean L* value. In this embodiment, the current mean L* value calculated by the image statistics processor is sent to the tone curve parameter calculation logic (shown in FIG. 1) (step 600). The desired mean L* value is pre-selected by the user or the manufacturer and stored within a memory (not shown) accessible to or within the tone curve parameter calculation logic (step 610). Under some circumstances, however, this pre-selected desired mean L* value may be adjusted based on additional information about the image being processed. For example, if the content of the image is known to the image processor to be predominantly black objects, then the desired L* value can be adjusted to be lower than 50, to avoid over-brightening the image. Or, if the image data is known to have a high level of noise, the desired L* value can be biased to be closer to the original image mean L* value, to avoid amplification of the noise through tone mapping.

For example, the desired mean L* value of the whole image can be pre-selected to be around 50 (medium brightness). Alternatively, the desired mean L* value can be selected to be 50 in a certain area of the image. As an example, for images containing a human face, the L* mean value at the face area can be set to 50. Using such criterion to determine the shift parameter of a sigmoidal tone curve generally results in a good quality image. However, when face recognition is not feasible, the mean L* value of the center part of an image, or some other area of interest in the image, can be brought to a level of around 50. This latter method of determining the shift parameter is more practical for a low cost imaging system. It should be understood that any other desired mean L* value can be used instead of 50.

The shift parameter can be calculated based on the current mean L* value and the desired mean L* value (step 620). For example, if $\overline{L}$ is the mean L* value of the area of interest in an image (e.g., a face area), and $L_{desired}$ is the desired mean L* value, the shift parameter is equal to:

$$\beta = (\overline{L} - L_{desired})/100 + 0.5. \quad \text{(Equation 7)}$$

When using an $L_{desired}$ value of 50, β is simply $\overline{L}$/100.

In a second embodiment, shown in FIG. 6B, the shift parameter β is calculated based on the L* percentile values. Various studies (see, e.g., Tanaka et al., 1997) have suggested that observers preferred renderings that have as large an output gamut as possible. Therefore, to accommodate these preferences, the shift parameter can be determined by shifting the histogram to make it occupy as much of the output device dynamic range as possible, while bringing as little disturbance to the shape of the histogram as possible to avoid saturation of a lot of points at either end of the distribution. This is done by using a centering function in which the tone curve is centered at midway between the end points of the histogram. This is a conservative choice, typically resulting in only small changes to the mean luminance of the image if the original RGB histogram is somewhat "normal" (values are not concentrated on a small section of the full range).

Therefore, when the tone curve parameter calculation logic receives the L* percentiles (e.g., nth and (100−n)th percentiles, with n being a convenient small value) (step 650), the shift parameter β can be calculated as the midpoint between these two end points (step 660). For example, if the nth percentile of pixel values in the histogram is $x_1$, and the (100−n)th percentile of pixel values is $x_2$, then the shift parameter is determined by the following equation:

$$\beta = \frac{x_1 + x_2}{2}. \quad \text{(Equation 8)}$$

The combined histogram of RGB values is preferably used to determine the percentiles, so that no color plane is ignored when calculating the shift of the tone curve. This is especially important for tone mapping performed on images with a strong color cast, to avoid color shifts after tone mapping.

Both methods of determining β discussed above have been implemented and tested on images. The first method (β calculated from mean L* value) is simpler to implement, and works well on most indoor and outdoor images. When the mean L* value of the whole image is used as β, it tends to over-brighten night-time or dark images, i.e., images that are meant to have a low mean L* value, such as candlelight scenes. The second method (using the average of the top and bottom percentile of the histogram as β) works better for dark images. It tends to change the image brightness less than the first method, so it is a more conservative method.

For some applications, it may be desirable to limit the extent that the sigmoidal curve is shifted, i.e., the extent the shift parameter β can deviate from 0.5. For example, for severely under-exposed images, excessive shifting up of the tone curve (β value close to 0) can result in a low-quality image due to amplification of sensor noise. Likewise, excessive shifting down of the tone curve (β value close to 1) for highly over-exposed images can produce color shifts in nearly saturated areas. To minimize these problems, the value of the shift parameter can be limited depending on the mean pixel values of the original image. If the original image mean is too high or too low, depending on the specific application of the tone mapping algorithm, then the shift parameter β is adjusted to deviate less from the midpoint 0.5 in order to reduce noise amplification. In one embodiment, a series of β value upper limits $T_j$ are pre-selected, each corresponding to one mean level $M_j$ of the original image pixel values. When the original image mean pixel value is less than $M_j$, then the β value is limited to be at least $T_j$, i.e., if the value calculated from Equation 7 or Equation 8 is less than $T_j$, then β is set to be equal to $T_j$. Similarly, a series of lower limits $T_k$ can also be pre-selected, each corresponding to one mean pixel level $M_k$. When the original image mean pixel value is larger than $M_k$, then β is limited to be no greater than $T_k$. By limiting the shift parameter in this way, artifacts resulting from tone over-compensation can be minimized.

Figure 7A:
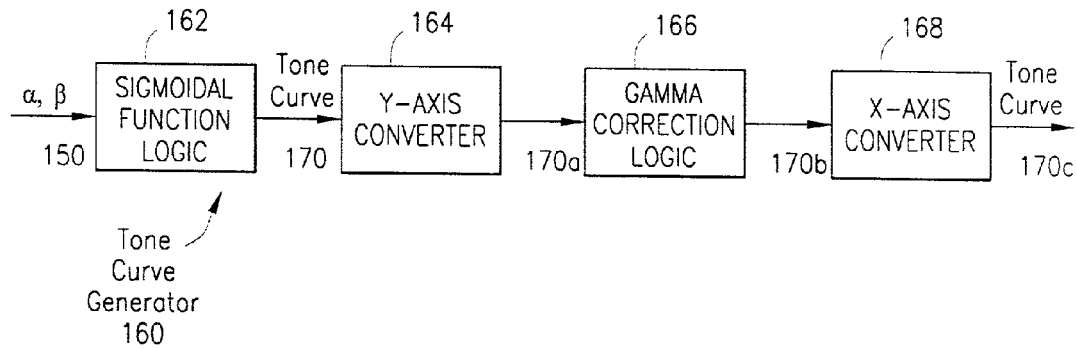
FIGS. 7A and 7B are block diagrams illustrating alternative embodiments for generating the tone curve of the tone mapping algorithm of the present invention.
Figure 8A:
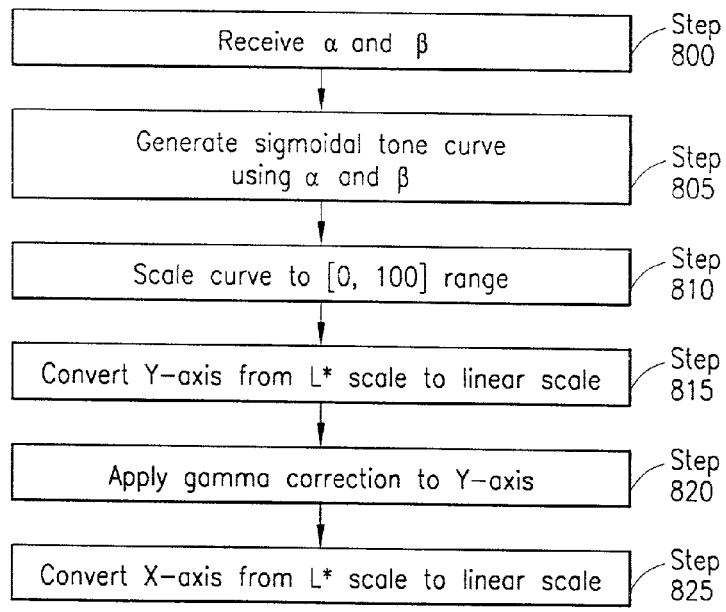
FIGS. 8A and 8B are flow charts illustrating the steps involved in the alternative embodiments shown in FIGS. 7A and 7B, respectively.
Figure 7B:
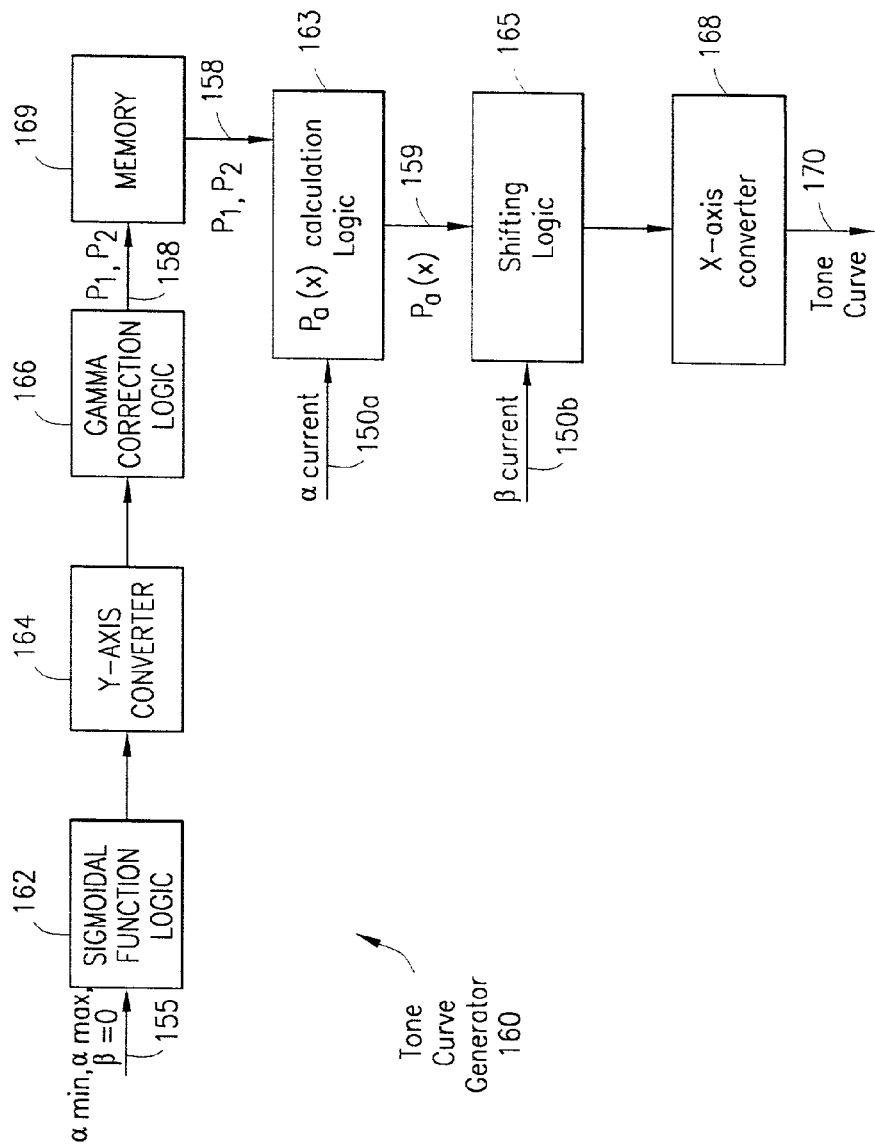

With reference now to FIGS. 7A and 7B, there are illustrated alternative embodiments for implementing the tone curve generator 160 shown in FIG. 1 of the drawings. In a first embodiment, as shown in FIG. 7A and described in the steps of FIG. 8A, when the tone curve parameters 150 (e.g., slope parameter α and the shift parameter β) have been calculated by the tone curve parameter calculation logic 140 (shown in FIG. 1), these parameters are sent to the tone curve generator 160 (step 800). Thereafter, the sigmoidal tone curve 170 is generated by sigmoidal function logic 162 within the tone curve generator 160 using the received tone curve parameters 150 and equations (1) and (3) listed above (steps 805 and 810). Once generated, the resulting tone curve 170 resembles the tone curve shown in FIG. 9.

The tone curve 170 shown in FIG. 9 is capable of mapping L* image input values onto L* image output values for the appropriate output device. However, since L* is not a commonly used scale in output devices, the output digital image data is converted to linear form before conversion to the scale required by specific output devices. In preferred embodiments, the Y-axis (L* image output values) is converted by a Y-axis converter 164 from an L* scale to a linear scale (step 815), which is approximately a power of three transformation, as discussed above, to produce tone curve 170a.

In addition, since most display devices, such as a CRT display, have an intensity to voltage response curve that is roughly a power function (e.g., if the pixel value is set at x, the displayed luminance is proportional to $x^γ$, with γ being the display's gamma value), the linear output values need to be gamma corrected in order to be displayed properly on such output devices. In most tone mapping methods, gamma correction is performed after mapping. In the sigmoidal tone mapping method described herein, gamma correction can either be performed separately after tone mapping, or can be combined with the tone mapping step. In one embodiment, the gamma correction is performed together with tone mapping by applying gamma correction logic 166 to the Y-axis to produce tone curve 170b (step 820). The combined effect of linear transformation and gamma correction of the Y-axis (output) is a power of 3/γ, where γ is the intended display gamma value, such as 2.4, if the output device is an sRGB (standard color space) display.

Typically, the tone mapping is applied to linear RGB input pixel values (e.g., linear image data 130 is supplied by the linear transformation device 30 to the tone mapping operator 40 in FIG. 1). The sigmoidal tone curve is generated assuming an L* scale on the X-axis, i.e., X-axis values uniformly sampled on the L* scale. Therefore, in order to properly map linear input values onto the tone curve, the tone curve's X-axis sampling has to be converted to be uniform on a linear scale for easy table lookup operation when applying the tone curve to images. This is done by an X-axis converter 168 to produce tone curve 170c (step 825), using a simple linear interpolation process, which requires only arithmetic operations, as described above in connection with the Y-axis converter. This final tone curve 170c is used by the tone mapping operator (shown in FIG. 1) to map the linear image data onto the luminance of the output device.

Figure 8B:
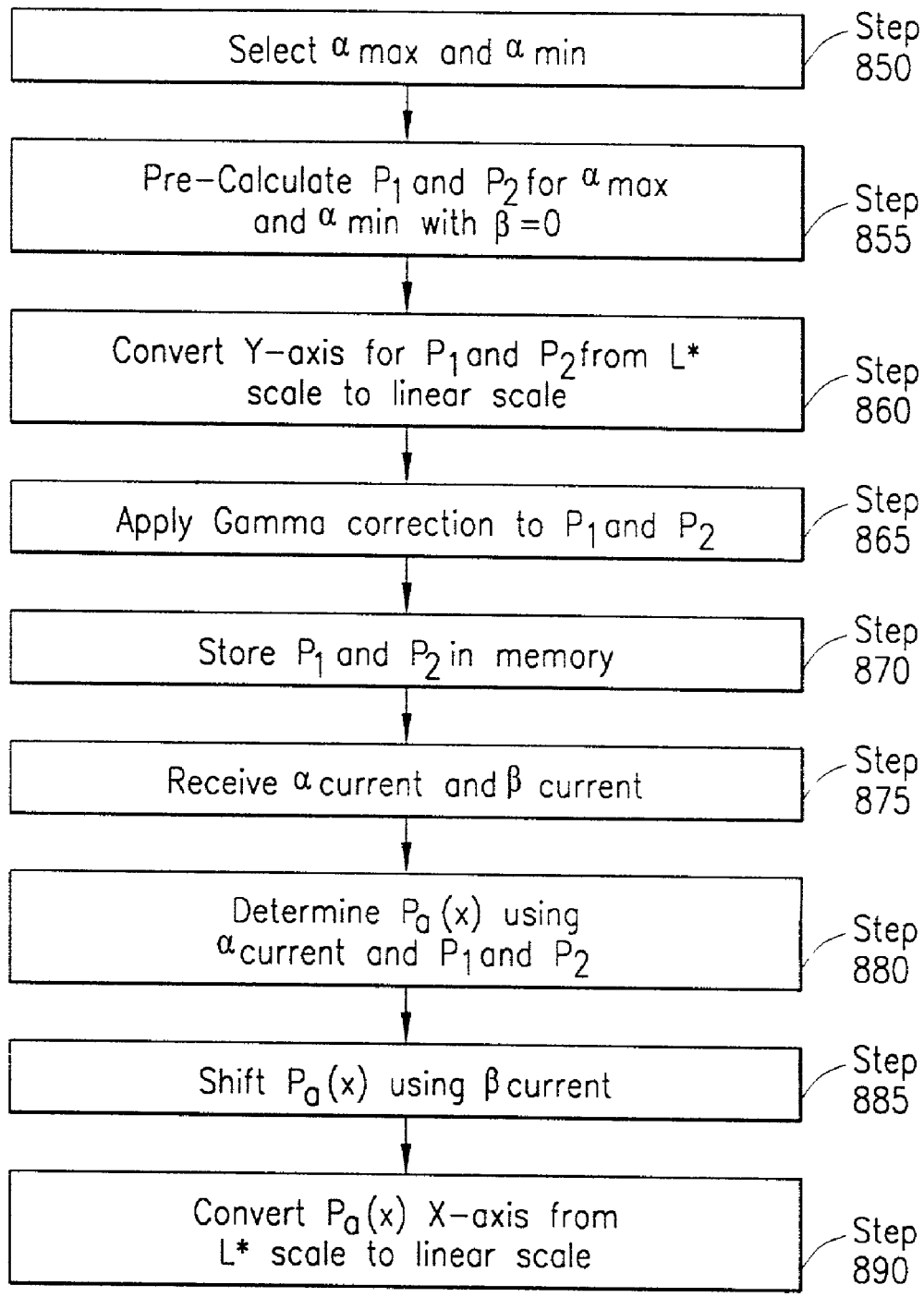

In a second embodiment, as shown in FIG. 7B and described in the steps of FIG. 8B, since one of the most computationally costly parts of the tone mapping algorithm involves the exponential function calculation in the sigmoidal function, to reduce computational complexity, an approximation of the sigmoidal tone curve calculation can be implemented with only arithmetic operations. The exponential calculation in the sigmoidal function can be avoided by pre-calculating a pair of fixed tone curves with two extreme slopes, and then interpolating to obtain tone curves with intermediate slopes. As discussed above, the shift parameter translates the tone curve on the horizontal (X) axis. Therefore, by pre-calculating the tone curves for a wider range on the X (input pixel value) axis, appropriate tone curves can be selected by "cutting out" different sections of the pre-calculated tone curves for different shift parameters.

Figure 10:
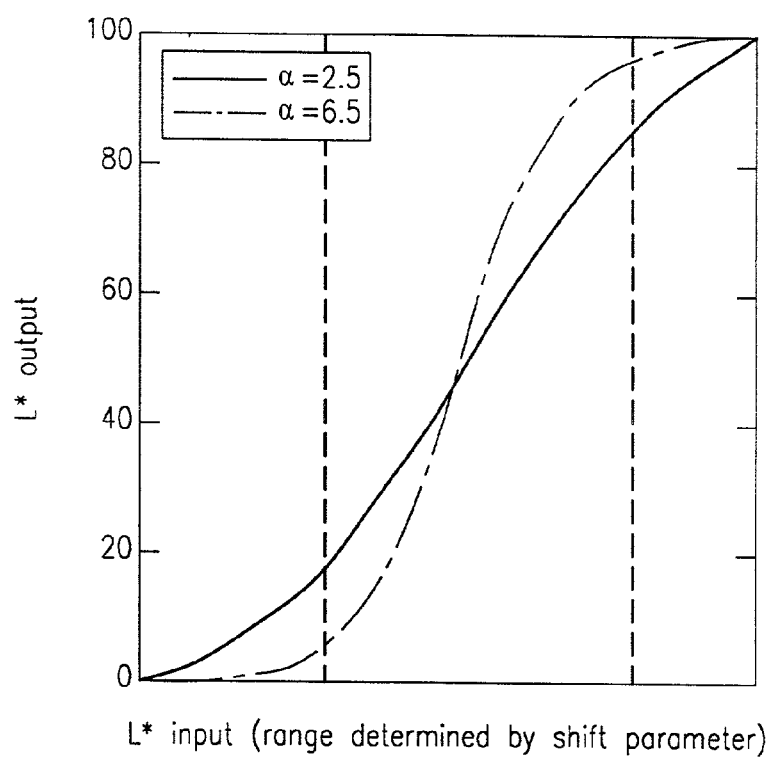
FIG. 10 is a graphical representation of two pre-generated tone curves plotted on L* axes, in accordance with the embodiment shown in FIGS. 7B and 8B.

To pre-calculate the two tone curves, the user or manufacturer must pre-select two slope parameters, $α_{max}$ and $α_{min}$ (step 850). The slope parameter α for most images falls in a range from 2.5 to 6.5. Therefore, in preferred embodiments, $α_{min}$ is set to be 2.5 and $α_{max}$ is set to be 6.5. Once the maximum and minimum slope parameters 155 are set, sigmoidal function logic 162 can pre-calculate the two tone curves (step 855), one with a slope of 2.5 (curve $P_1$), which gives an almost linear tone curve (on the L* scale), and one with a steep slope of 6.5 (curve $P_2$), which gives a lot of contrast enhancement to the image. The two pre-generated tone curves are shown in FIG. 10. It should be noted that the two curves are generated for a shift value β of 0. (The X-axis range for different β values are later determined by translating the X origin on the X-axis, as discussed hereinbelow.)

For slope values between 2.5 and 6.5, the tone curve is generated by linear interpolation between $P_1$ and $P_2$. Let $P_a(x)$ be the tone curve with an α value of a, with a ⊂ [2.5, 6.5], then:

$$P_a(x) = P_1(x) + (P_2(x) - P_1(x)) * \frac{a - 2.5}{6.5 - 2.5}. \quad \text{(Equation 9)}$$

Figure 11A:
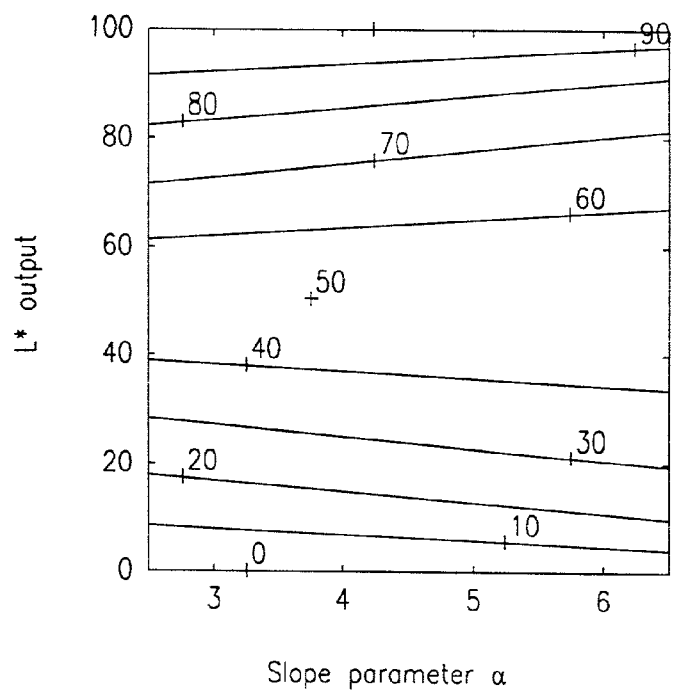
FIG. 11A is a graphical representation of output L* levels plotted as a function of the slope parameter, in accordance with the embodiment shown in FIGS. 7B and 8B.

This of course is an approximation, but for the limited α value range between 2.5 and 6.5, the approximation is reasonably accurate. In FIG. 11A, the tone curve output L* values are plotted as a function of α 11 different input pixel levels (represented by the 11 lines). As can be seen, the output L* values are close to linearly related to α.

Figure 11B:
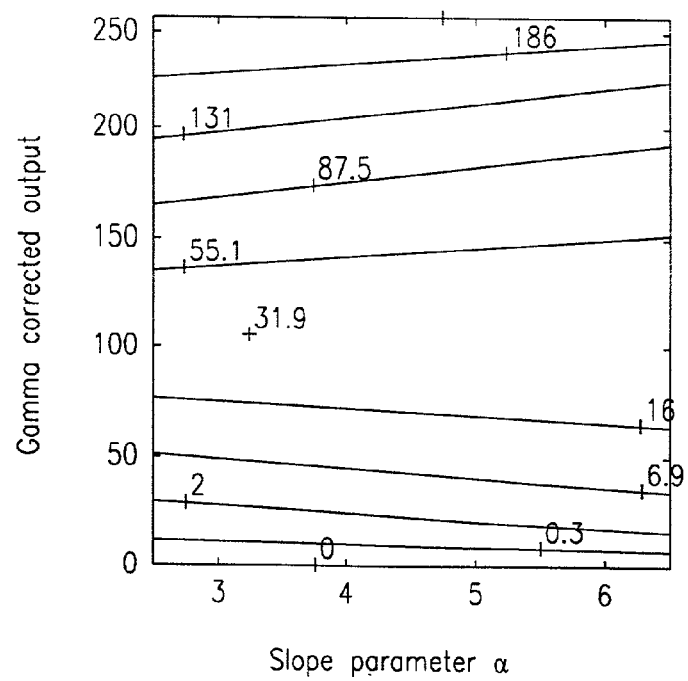
FIG. 11B is a graphical representation of gamma corrected output levels plotted as a function of the slope parameter, in accordance with the embodiment shown in FIGS. 7B and 8B.

As discussed above, typically, the tone mapping output is gamma-corrected linear RGB values ready for display on a screen. Therefore, as described above in connection with FIGS. 7A and 8A, the Y-axis of P$_1$ and P$_2$ 158 may be converted to gamma-corrected linear RGB values (steps 860 and 865) by the Y-axis converter 164 and gamma correction logic 166 of the tone curve generator 160. When the tone curve output P$_a$(x) is gamma corrected linear RGB values, the relationship with α is still quite linear, as shown in FIG. 11B. Therefore, by pre-calculating P$_1$ and P$_2$ 158 as gamma corrected pixel values, the interpolated tone values will be gamma corrected as well. This means the tone curve calculation only requires the arithmetic operations used in interpolation (equation 9 above). Once the gamma corrected tone curves P$_1$ and P$_2$ 158 have been pre-generated, they are stored in a memory 169 (step 870) accessible to or within the tone curve generator for later use in calculating the tone curve for a particular set of input values.

When the tone curve generator 160 receives the current slope parameter α$_{current}$ 150a and the current shift parameter β$_{current}$ 150b (step 875) from the tone curve parameter calculation logic (shown in FIG. 1), calculation logic 163 within the tone curve generator 160 determines P$_a$(x) 159 using the gamma corrected tone curves P$_1$ and P$_2$ 158 and the current slope parameter 150a and equation 9 above (step 880). Thereafter, to select a section of P$_a$(x), the current shift parameter 150b and P$_a$(x) 159 are transmitted to shifting logic 165 within the tone curve generator 160 (step 885). Since the shift parameter 150b simply translates the tone curve on the X-axis, tone curves with different shift parameters can be obtained by translation on the X-axis of P$_a$(x).

For example, assuming P$_a$(x) is generated with a shift parameter of 0 and in the range [−100, 100], to get a tone curve with a shift parameter of β at the X-axis range of [0, 100], the tone curve is translated on the X-axis so that an X value of −β*100 now becomes 0, and an X value of (1−β)*100 becomes 100. The tone curve with shift parameter β is obtained by "cutting out" the pre-generated tone curve P$_a$(x) from the point X=−β*100 to the point X=(1−β)*100. In implementation, this operation involves simply moving the file pointer to different starting points in a pre-generated table, thus requiring almost no computation.

After the tone curve is "cut out" from P$_a$(x), the two ends of the tone curve need to be scaled to the full Y range. This again only requires arithmetic operations on each entry of the tone mapping table that was previously cut out from the pre-generated table. Thereafter, as discussed above in connection with FIGS. 7A and 8A, the X-axis converter 168 converts the X-axis from an L* scale to a linear scale (step 890) to produce the final tone curve 170. It should be noted that the translation of the tone curve can happen before or after the interpolation step required to get the correct slope by translating tone curves P$_1$ and P$_2$ 158. For the least amount of computation, the translation is performed first, so that the interpolation only needs to be done on the "cut out" section of the pre-generated tone curves P$_1$ and P$_2$ 158.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A digital image system capable of receiving digital image data representing at least part of a digital image and mapping said digital image data onto the range of an output device, said digital image system comprising:
   an image statistics processor capable of calculating at least one current image statistic based on said digital image data;
   calculation logic connected to receive said at least one current image statistic from said image statistics processor and further being capable of calculating at least one tone curve parameter based on said at least one current image statistic and at least one perceptual preference, said perceptual preference specified with respect to said output device in order to obtain from said output device a visually perceptible behavior that corresponds to said perceptual preference; and
   a tone curve generator connected to receive said at least one tone curve parameter from said calculation logic and further being capable of generating a tone curve using said at least one tone curve parameter and a sigmoidal function, said tone curve being used to map said digital image data onto the range of said output device.

2. The system of claim 1, further comprising:
   a linear transformation device connected to receive said digital image data, convert said digital image data into linear image data and transmit said linear image data to said image statistics processor, said image statistics processor using said linear image data in calculating said at least one current image statistic.

3. The system of claim 2, wherein said image statistics processor comprises:
   a histogram generator connected to receive said linear image data and generate a histogram of the pixel values represented by said linear image data, said histogram containing a plurality of bins representing respective ranges of pixel values and a count of the number of pixel values represented by said linear image data within each of said plurality of bins;
   a converter capable of converting a bin center value for each of said bins associated with said histogram from a linear scale to an L* scale to produce a plurality of L* bin center values; and
   statistics calculation logic connected to receive said count from said histogram generator and said plurality of L* bin center values from said converter and calculate said at least one current image statistic using said count and said plurality of L* bin center values.

4. The system of claim 3, further comprising:
   a memory for storing said plurality of L* bin center values prior to said histogram being generated, said statistics calculation logic retrieving said plurality of L* bin center values in response to receiving said count.

5. The system of claim 1, wherein said at least one tone curve parameter includes a slope parameter and a shift parameter and wherein said at least one current image statistic includes a current L* standard deviation and one of a current mean L* value or low and high L* percentile values.

6. The system of claim 5, wherein said at least on e perceptual preference includes a desired L* standard deviation and one of a desired mean L* value or a centering function, said slope parameter being calculated using said current L* standard deviation and said desired L* standard deviation, said shift parameter being calculated using either said current mean L* value and said desired mean L* value or said low and high L* percentile values and said centering function.

7. The system of claim 6, further comprising:
an upper pre-selected mean L* value and an associated upper pre-selected shift value, said shift parameter being set to said upper pre-selected shift value when said current mean L* value is less than said upper pre-selected mean L* value and said calculated shift parameter is less than said upper pre-selected shift value: and
a lower pre-selected mean L* value and an associated lower pre-selected shift value, said shift parameter being set to said lower pre-selected shift value when said current mean L* value is greater then said lower pre-selected mean L* value and said calculated shift parameter is greater than said lower pre-selected shift value.

8. The system of claim 5, further comprising a memory for storing first and second pre-calculated tone curves generated by said tone curve generator prior to said digital image system receiving said digital image data, said first pre-calculated tone curve having a minimum slope and said second pre-calculated tone curve having a maximum slope.

9. The system of claim 8, wherein said tone curve generator comprises:
calculation logic connected to receive said slope parameter and said first and second pre-calculated tone curves, said calculation logic being further capable of interpolating between said first and second pre-calculated tone curves using said slope parameter to obtain an initial tone curve; and
shifting logic connected to receive said initial tone curve and said shift parameter, said shifting logic further capable of shifting said initial tone curve on the X-axis using said shift parameter to produce said tone curve used in mapping said digital image data onto the range of said output device.

10. The system of claim 1, wherein said tone curve generator further comprises:
gamma correction logic for applying gamma correction to the Y-axis of said tone curve; and
a converter for converting the X-axis of said tone curve to the scale of said digital image data.

11. A method for mapping digital image data representing at least part of a digital image onto the range of an output device, said method comprising:
receiving said digital image data at a digital image system;
calculating at least one current image statistic based on said digital image data;
calculating at least one tone curve parameter based on said at least one current image statistic and at least one perceptual preference, said perceptual preference specified with respect to said output device in order to obtain from said output device a visually perceptible behavior that corresponds to said perceptual preference; and
generating a tone curve using said at least one tone curve parameter and a sigmoidal function, and using said tone curve to map said digital image data onto the range of said output device.

12. The method of claim 11, wherein said step of calculating said at least one current image statistic further comprises:
converting said digital image data into linear image data; and
calculating said at least one current image statistic using said linear image data.

13. The method of claim 12, wherein calculating said at least one current image statistic further comprises:
generating a histogram of the pixel values represented by said linear image data, said histogram containing a plurality of bins representing respective ranges of pixel values and a count of the number of pixel values represented by said linear image data within each of said plurality of bins;
converting a bin center value for each of said bits associated with said histogram from a linear scale to an L* scale to produce a plurality of L* bin center values; and
calculating said at least one current image statistic using said count and said plurality of L* bin center values.

14. The method of claim 13, wherein converting said bin centers further comprises:
converting said bin center values to produce a plurality to produce a plurality of L* bin center values prior to said step of generating; and
storing said plurality of L* bin center values within a memory.

15. The method of claim 11, wherein said at least one tone curve parameter includes a slope parameter and a shift parameter and wherein said at least one current image statistic includes a current L* standard deviation and one of a current mean L* value or low and high L* percentile values.

16. The method of claim 15, wherein said at least one perceptual preference includes a desired L* standard deviation and one of a desired mean L* value or a centering function, calculating said at least one tone curve parameter further comprising:
calculating said slope parameter using said current L* standard deviation and said desired L* standard deviation; and
calculating said shift parameter using either said current mean L* value and said desired mean L* value or said low and high L* percentile values and said centering function.

17. The method of claim 16, wherein calculating said at least one tone curve parameter further comprises:
setting said shift parameter to be equal to an upper pre-selected shift value when said current mean L* value is less than an upper pre-selected mean L* value associated with said upper pre-selected shift value and said calculated shift parameter is less than said upper pre-selected shift value; and
setting said shift parameter to be equal to a lower pre-selected shift value when said current mean L* value is greater than a lower pre-selected mean L* value associated with said lower pre-selected shift value and said calculated shift parameter is greater than said lower pre-selected shift value.

18. The method of claim 15, wherein generating further comprises:
generating first and second pre-calculated tone curves prior to said step of receiving said digital image data, said first pre-calculated tone curve having a minimum slope and said second pre-calculated tone curve having a maximum slope.

19. The method of claim 18, wherein generating said tone curve used in mapping said digital image data onto the range of said output device comprises:
interpolating between said first and second pre-calculated tone curves using said slope parameter to obtain an initial tone curve: and shifting said initial tone curve on the X-axis using said shift parameter to produce said tone curve used in mapping said digital image data onto the range of said output device.

20. The method of claim 11, wherein generating said tone curve comprises:

applying gamma correction to the Y-axis of said tone curve; and converting the X-axis of said tone curve to the scale of said digital image data.

* * * * *

UNITED STATES PATENT AND TRADEMARK OFFICE
CERTIFICATE OF CORRECTION

| | |
|---|---|
| PATENT NO. | : 7,023,580 B2 |
| APPLICATION NO. | : 09/839335 |
| DATED | : April 4, 2006 |
| INVENTOR(S) | : Zhang et al. |

It is certified that error appears in the above-identified patent and that said Letters Patent is hereby corrected as shown below:

In column 14, line 62, in Claim 6, delete "on e" and insert -- one --, therefor.

In column 15, line 11, in Claim 7, delete "value:" and insert -- value; --, therefor.

In column 15, line 34, in Claim 9, after "logic" insert -- being --.

In column 16, line 11, in Claim 13, delete "bits" and insert -- bins --, therefor.

In column 16, line 18, in Claim 14, after "values" delete "to produce a plurality".

In column 16, line 67, in Claim 19, delete "curve:" and insert -- curve; --, therefor.

Signed and Sealed this

Fifteenth Day of August, 2006

JON W. DUDAS
*Director of the United States Patent and Trademark Office*